United States Patent [19]

Massey et al.

[11] 3,897,231

[45] July 29, 1975

[54] METHOD FOR CONTACTING HOT, VISCOUS, MOLTEN SLAG WITH GASEOUS REACTANTS

[75] Inventors: Michael J. Massey, Pittsburgh; Robert W. Dunlap, Ross Township, both of Pa.

[73] Assignees: Shenango Incorporated; Duquesne Slag Products Co., both of Pittsburgh, Pa.; The Standard Slag Company, Youngstown, Ohio

[22] Filed: Feb. 25, 1974

[21] Appl. No.: 445,071

[52] U.S. Cl. ............................. 65/19; 65/141; 75/24
[51] Int. Cl. .............................................. C03b 19/08
[58] Field of Search ...................... 65/19; 75/24, 30

[56] References Cited
UNITED STATES PATENTS

| | | | |
|---|---|---|---|
| 777,388 | 12/1904 | McDowell | 65/19 |
| 1,378,223 | 5/1921 | Garr | 75/24 X |
| 1,414,491 | 5/1922 | Welch | 75/24 |
| 1,502,793 | 7/1924 | Maguet | 65/19 |
| 1,535,109 | 4/1925 | Davies | 75/30 X |
| 3,738,820 | 6/1973 | Osborn et al. | 65/19 |

FOREIGN PATENTS OR APPLICATIONS

| | | | |
|---|---|---|---|
| 238,017 | 9/1959 | Australia | 75/24 |
| 238,018 | 9/1959 | Australia | 75/24 |
| 223,846 | 5/1958 | Australia | 75/24 |

*Primary Examiner*—Robert L. Lindsay, Jr.
*Attorney, Agent, or Firm*—Buell, Blenko & Ziesenheim

[57] ABSTRACT

A method for intimately contacting hot, viscous, molten slag, with gaseous reactants for desulfurization of the slag. Viscous molten slag is passed over a weir, and falls. Reactant gases are applied upward to contact the underside of the molten slag and produce a high ratio of surface to volume of slag in the form of thin sheets and/or small droplets. The surface area produced helps to provide an intimate contact and reaction between the slag and the reactant.

6 Claims, 7 Drawing Figures

METHOD FOR CONTACTING HOT, VISCOUS, MOLTEN SLAG WITH GASEOUS REACTANTS

This invention relates to a method for intimately contacting hot, viscous, molten slag, as for example blast-furnace slag, with gaseous reactants to facilitate the efficient desulfurization of the slag. Flowing molten slag is caused to free fall during which time reactant gases are applied under moderate force from below to controllably increase the surface to volume ratio by expanding the surface area of the slag. This is accomplished by the reactant gas striking the slag and forming large, thin sheets and/or small droplets of molten slag which are contacted with the gaseous reactant. After passing through the free fall zone of contacting, the molten slag collapses to its former high volume to surface area state and flows from the system.

PROBLEM PRESENTED AND THE FAILURE OF THE PRIOR ART TO SOLVE IT

A number of attempts have been made in the past to desulfurize molten blast-furnace slag. For example, large 50 to 75 ton slag ladles have been repeatedly sparged with varying quantities of several reactant gases. Small, shallow pools of molten slag have also been formed on the casthouse floor and heavily sparged. In each case, minimal effective contacting and consequently little or no desulfurization was achieved.

The problem of efficiently contacting the sulfur in molten slag with reactant gas is complicated. Diffusion of sulfur from the interior of slag to a surface is extremely slow. At the same time, due to its high viscosity (300–500 centipoise) and high surface tension (300–500 dynes/cm), generation of increased surface area in slag is difficult. Reaction rates of sulfur at a surface are extremely high however, so if substantial surface can be generated, net reaction efficiency can be increased due to reduced sulfur diffusion distances.

The importance of surface area in slag-gas reactions is confirmed in a series of British experiments (See British Pat. Nos. 808,788; 847,864; 847,865) wherein large slag surface areas were generated and contacted with an oxidant. Slag was cascaded down a refractory lined tower in the form of small droplets and contacted with a stream of oxygen. In one experiment, approximately 70 percent of the slag's sulfur was removed.

Although verifying the critical importance of surface area generation and contacting in effective slag-gas reaction, the British design has at least 3 serious shortcomings with respect to any potential commercial use: (1) It requires large amounts of space, particularly vertical elevation (up to 10 feet), which is in minimal supply at most blast furnaces; (2) the efficiency of oxygen utilization in the system is prohibitively low (less than 20 percent); and (3) the mechanical means employed to generate high surface area droplets of slag are cumbersome and pose potential problems of erosion and fouling. Due to the size of the system and the large excess of oxygen employed, radiant and convective heat losses from the molten slag pose an additional problem.

THE INVENTORS' SOLUTION TO THE PROBLEM

The contacting system now presented by the inventors Massey and Dunlap overcomes numerous limitations evident in the prior art of gas-liquid contacting of hot, viscous fluids, particularly molten slags. It is predicated on the observation that controlled amounts of gas properly impinged on a semi-cylindrical, free-falling molten slag produces increases in the ratio of surface to volume by extending the material into large, thin sheets and/or small droplets of greatly increased surface area.

Of itself, the simple blowing of slag with a gas is, of course, not new. For example, slag wool was once routinely made by drawing molten slag from a cupola furnace and blowing it with steam or air under high pressure (typically 100 psig or more). However, these techniques did not have as a purpose the generation of controlled amounts of surface area for intimate contacting of fluid and gas and efficient consumption of incident gas by reaction. In the context of the present invention, these techniques for surface area generation suffered from several important shortcomings: (1) Volumes of air or steam employed are far in excess of those consistent with an efficient consumption of reactant during contacting; (2) Due to the gas volumes and pressures required, energy requirements for this system are quite high; and (3) The slag temperature is substantially reduced in the course of slag wool contacting which is in direct conflict with the goal of the present invention, wherein slag temperatures are maintained high, certainly above the melting point.

The present invention provides an effective, more facile, economical and efficient means for controllably contacting a hot, viscous molten slag with a reactant gas for the effective reaction of one or more of its constituents. This result is accomplished in part by generating surface area in the molten slag with a minimum amount of energy and without the use of moving parts or other impingement-type mechanical components, thereby eliminating both the need for high reactant gas pressures and potential problems in the erosion and wear of moving reactor parts. Further, intimate contacting of reactant gas with newly generated surface is maximized by the employment of reactant gas itself as the sole vehicle for fluid surface area generation. This result is achieved in a reactor of sufficiently small size as to be satisfactorily accommodated in anticipated industrial applications for the desulfurization of molten slags.

The molten slag is contacted with the reactant gas such that the reactant feed gas is both fed at minimal pressures and efficiently consumed in reaction, key failures of the prior art. Also there is an effective retention of any exothermic reaction heat produced as a result of the efficient contacting and reaction of gas and molten slag. This is accomplished by employing a small, well insulated reactor which is subject to only minor heat losses by radiation. This is of particular importance in contacting for the desulfurization of molten slags since even relatively small heat losses may occasionally lead to partial slag solidification and incumbent plugging of the reactor vessel.

We provide a method for intimately contacting hot, viscous, molten slag with a gaseous reactant for desulfurization of the slag which comprises applying the reactant (in the form of a thin wide angle sheet having a plane aligned along the axis of the slag) under moderate force to the slag which is free falling to controllably increase the surface to volume ratio of the slag and to create new and additional surface area of the slag in the form of thin concave sheets and/or droplets which are contacted with the reactant without substantial loss of heat from the slag.

In the accompanying drawings we have illustrated a present preferred method of practicing the invention in which.

Figure 1:
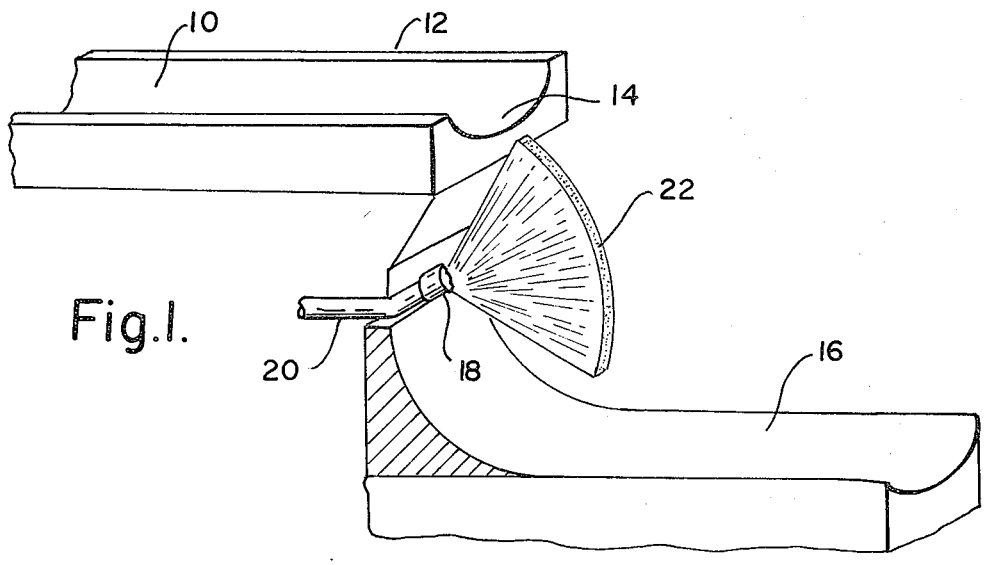
FIG. 1 is a schematic diagram of the system showing the method.

Referring to FIG. 1, molten slag 10 (not depicted) is fed along a runner 12 and into a reactor enclosure (not shown in the Figure). After entering the reactor, the molten slag travels a short distance until the runner 12 reaches a point 14 where it suddenly drops 1 to 2 feet. At this point the molten slag leaves the runner 12 and begins a free fall descent to a second runner 16 situated directly below. Located directly under the end of the first runner 12 is a nozzle 18 whose flow pattern is aligned along the axis of the fluid flow of the molten slag. Reactant gas 20 enters this nozzle at moderate pressure and is forced upward, preferably in the form of a thin, wide-angled sheet 22 in the plane of the slag flow. The gas sheet initially contacts the falling molten slag immediately as it leaves the runner 12. A continuing fresh gas-slag contact is maintained throughout the fall of the slag by virtue of the wide angle through which reactant gas is delivered.

Figures 2A, 2B, 2C, 2D:
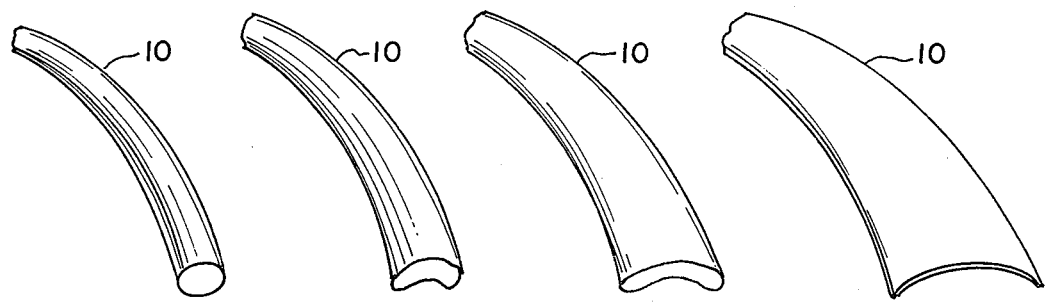
FIGS. 2A – 2D are schematic diagrams showing the sequence of the fluid pattern of the molten slag as a function of reactant feed gas momentum.
Figures 3A, 3B:
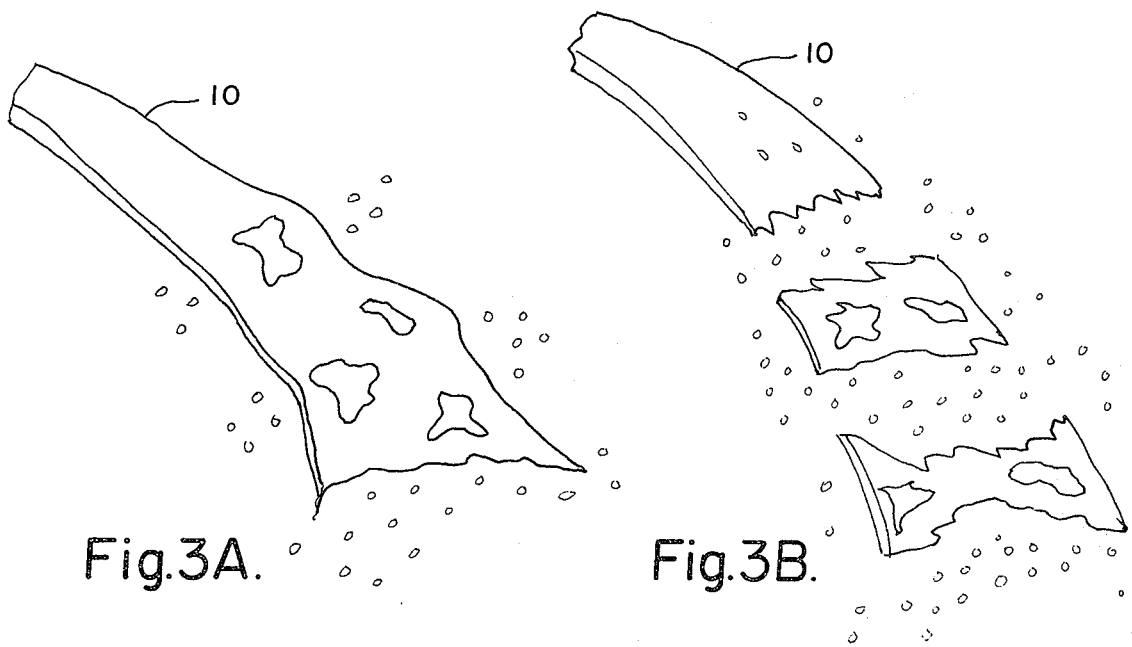
FIGS. 3A – 3B are schematic diagrams showing a sequence in further to that shown in FIGS. 2A – 2D for the fluid pattern of the molten slag as a function of reactant feed gas momentum.

Referring to FIG. 2, as the momentum of the reactant gas contacting the falling slag is increased, an initially cylindrical fluid flow is increasingly converted into a flow pattern involving thin, concave sheets in which FIG. 2A shows no reactant gas feed; FIG. 2B shows ¼ of reactant momentum; FIG. 2C shows ½ of reactant momentum; and FIG. 2D shows full reactant momentum for thin sheet formation. Energy requirements for the generation of surface in this specific configuration are particularly low, and depend importantly on the delivery of the reactant gas in thin sheet form (at least somewhat narrower than the slag it is contacting) over a wide angle as is illustrated in FIG. 1. It is understood that a similar effect could be achieved by arranging a multiplicity of small point source nozzles over a similar angle. Additional surface area can be produced by further increasing reactant gas momentum, thereby partially breaking down the thin sheet of fluid shown in FIG. 2D into small droplets of very high surface area shown in FIGS. 3A and 3B. The configuration shown in FIGS. 3A and 3B depicts incipient instability which is a preferred geometry.

Referring again to FIG. 1, as molten slag, now fully extended into thin sheet and/or droplet form, reaches the lower runner 16, the slag collapses on the mixture of reactant and product gases below it, forcing a final mixing as molten material coalesces and flows down the runner 16 with the gas separating and escaping to the roof of the reactor shell (not shown). If further reaction is desired, additional runner drops and contacting nozzles can be aligned in the form of a cascade. Although the preferred nozzle spray pattern is as shown in FIG. 1, it is understood that other patterns can be employed in the general practice of this invention.

EXAMPLE

In a series of field experiments, molten blast-furnace slag having viscosity and surface tension of approximately 300 centipoise and 400 dynes/cm, respectively, and containing 1.87 wt percent sulfur flowed down a runner at about 1 ton/min. Extending about 25 feet, this runner terminated at the edge of a water-filled quenching pit. Slag left the runner at this point and fell approximately 4 to 5 feet before hitting the water in the pit. A gas nozzle similar to that shown in FIG. 1 and located at the edge of the pit 1 foot directly below the runner was supplied with 100 to 150 SCFM of pure oxygen at approximately 20 psig which is sufficient reactant to remove 25–35 percent of the sulfur from the slag. At this rate, falling slag was expanded into thin, semi-stable sheets which broke into droplets as they approached the water in the pit. Quenched slag subsequently recovered from the pond contained approximately 1.3 wt percent sulfur, indicating a 30+ percent desulfurization.

While we have shown and described one preferred embodiment of our invention and method of practicing the same, it will be understood that this invention is not limited thereto, but may be otherwise embodied within the scope of the following claims.

We claim:

1. A method for intimately contacting hot, viscous, molten slag with a gaseous reactant which comprises:
   a. causing the slag to free fall; and
   b. applying a controlled amount of gaseous reactant to the slag under force and from beneath the falling slag in the form of a thin wide angle sheet having a plane aligned along the axis of the falling slag to increase the surface to volume ratio of the slag and to create new and additional concave surface area of the slag which surface area is contacted with the reactant.

2. The method as recited in claim 1 wherein the new and additional surface area created is in the form of thin sheets.

3. The method as recited in claim 1 wherein the new and additional surface area created is in the form of a mixture of thin sheets and small droplets.

4. The method as recited in claim 1 wherein the new and additional surface area created is in the form of droplets.

5. The method as recited in claim 1 wherein the reactant gas is repeatedly applied in the form of a cascade of applications of the reactant gas.

6. The method as recited in claim 1 wherein the method of intimately contacting hot, viscous, molten slag with a gaseous reactant is for desulfurization of the slag.

* * * * *